United States Patent [19]

Giguere et al.

[11] 4,025,818

[45] May 24, 1977

[54] WIRE ION PLASMA ELECTRON GUN

[75] Inventors: Robert P. Giguere, Los Angeles; Robert D. Washburn, Malibu; George Wakalopulos, Los Angeles, all of Calif.

[73] Assignee: Hughes Aircraft Company, Culver City, Calif.

[22] Filed: Apr. 20, 1976

[21] Appl. No.: 678,524

[52] U.S. Cl. ................................ 315/337; 313/359; 315/169 R; 315/300; 330/4.3; 331/94.5 R; 331/94.5 M; 332/7.51

[51] Int. Cl.² .................... H01J 27/00; H01J 33/02

[58] Field of Search ............... 315/160, 167, 169 R, 315/299, 300, 301, 334, 337; 330/4.3; 331/94.5 R, 94.5 M, 94.5 PE; 332/7.51; 313/187, 230, 359

[56] References Cited

UNITED STATES PATENTS

| | | | |
|---|---|---|---|
| 3,769,600 | 10/1973 | Denholm et al. | 313/359 X |
| 3,831,052 | 8/1974 | Knechtli | 313/187 |
| 3,962,656 | 6/1976 | Peressini | 331/94.5 PE |

*Primary Examiner*—Eugene R. La Roche
*Attorney, Agent, or Firm*—W. H. MacAllister; Martin E. Gerry

[57] ABSTRACT

A high voltage glow discharge power source providing a plurality of glow discharges by gas ignition within an first elongated member, which member has a central bore along the axis of elongation of the member. A second member used in an E-gun application having a cavity with a soft vacuum in the cavity, and a third similar member parallel to the second member and a common interface boundary between the second and third members. Electrodes are positioned along the outer surface along the length of the first member to which current sources and sinks are connected in alternation. The second member has a common wire running its length with auxiliary wires connected to the common wire which are connected in turn to the sources and sinks. A DC power supply provides the energy for the current sources and sinks used with the first member. End plates covering the bore of the first member are transparent to optical frequencies. Glow discharges occur within the bore so that when a laser generator beam is diverted into the bore through the end plates, the gas in the bore being ignited to provide the glow discharges, effects a power gain in the laser signal at the other end of the bore. The E-gun configuration has its first member completely enclosed and provides a cathode within the second portion to extract positive ions through the common grid boundary between the second and third portions. The E-gun may be used in conjunction with a gas chamber coupled to the first portion filled with laser type gas which the E-gun ionizes, igniting the gas.

17 Claims, 13 Drawing Figures

Fig. 4.
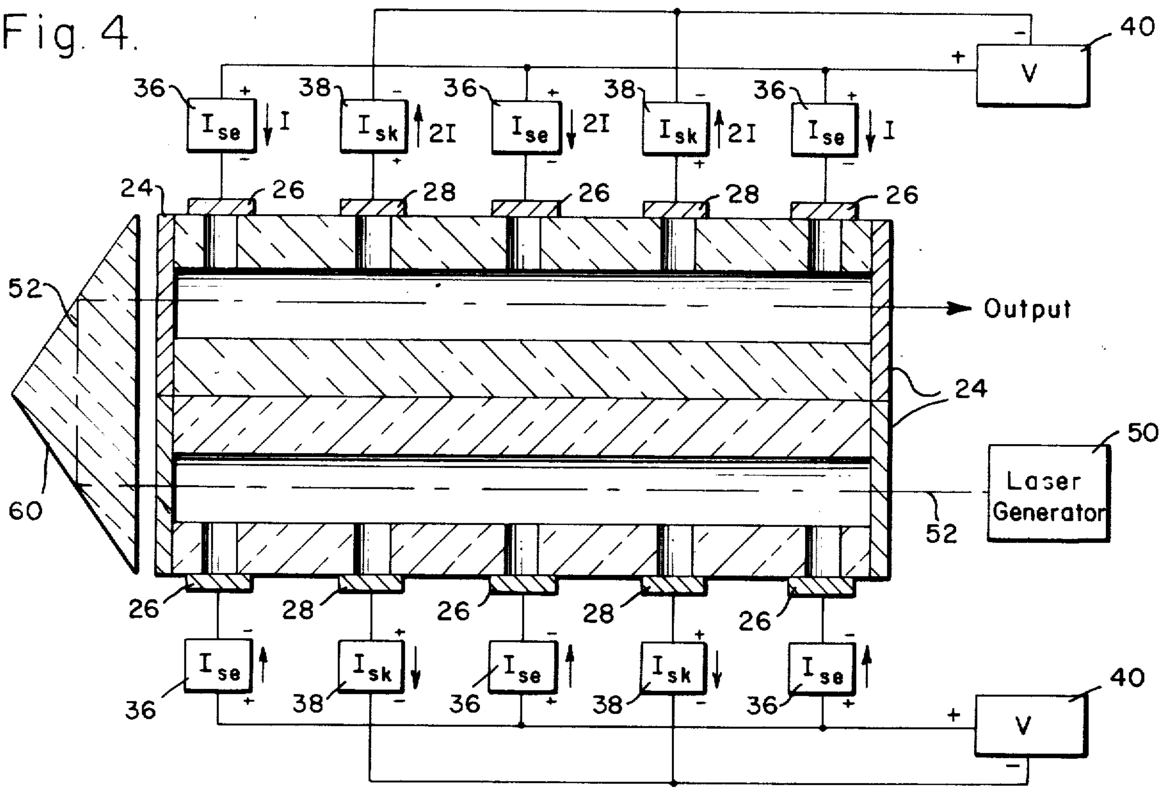
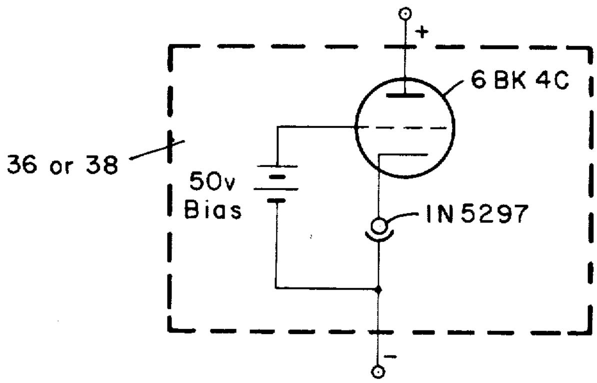
Fig. 5.

Fig. 9.
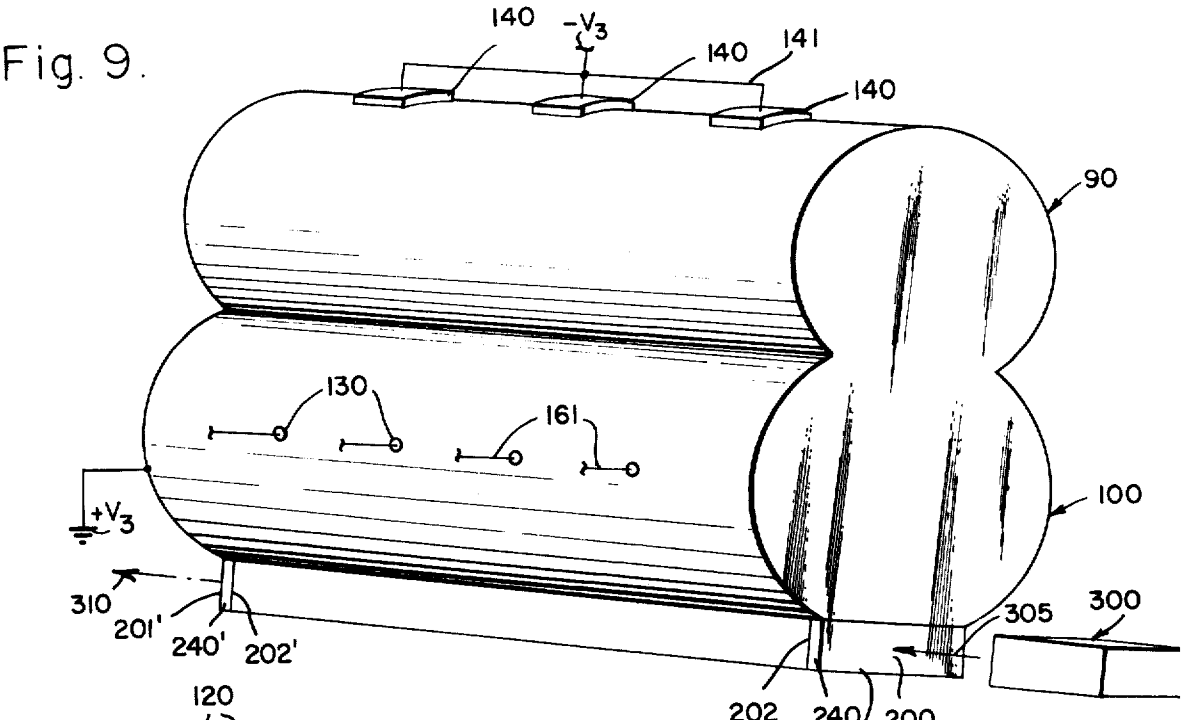
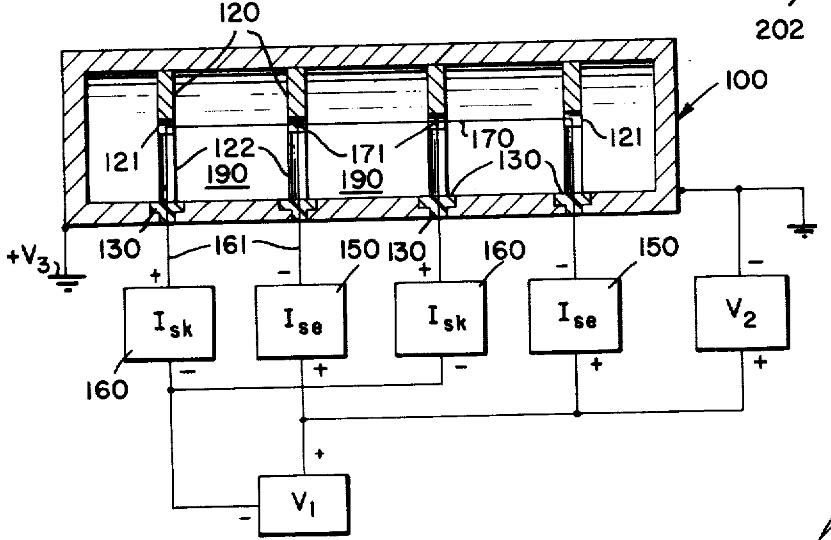
Fig. 11.
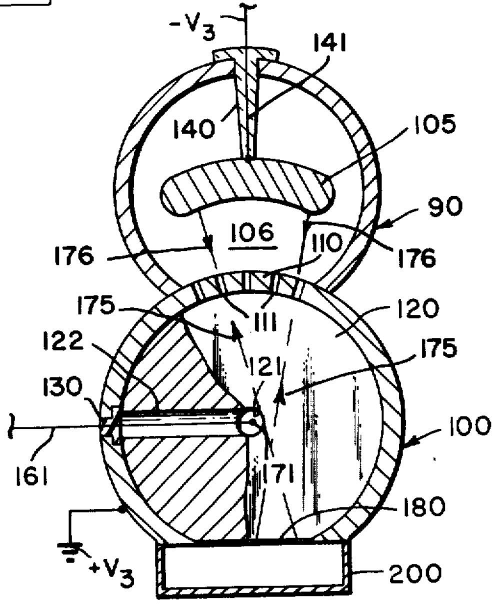
Fig. 10.

WIRE ION PLASMA ELECTRON GUN

BACKGROUND OF THE INVENTION

This invention relates to a high voltage discharge power source used to provide power to high frequency electronic circuits or systems, and particularly to electron guns providing ion plasma.

The traditional method of generating a gas discharge is simply to place a current limiting ballast resistor in series with the gas tube and then apply a large voltage across the combination of gas tube and ballast resistor.

For laser amplifier use it is desired to form a continuous uniform discharge over a one meter predetermined length of a gas discharge tube having a confined gas therein. The necessary driving voltage in prior art discharge devices becomes enormous; in the order of 375 kv. However, the single discharge can be broken into several shorter lower voltage discharge paths, but such shorter lower voltage discharge paths entails the use of independent isolated voltage sources. For a practical system the costs for more than two sections of such shorter lower voltage discharge paths becomes economically prohibitive.

Another prior art alternative is the use of additional ballast resistors to stabilize the discharge from a single voltage source. However, such method necessarily results in dead spaces between discharge elements. With dead spaces between anodes and/or cathodes, there is no assurance that a discharge current will ignite between adjacent discharge branches in the prior art discharge methods. Although straight-forward in concept, such prior art method does not meet the requirements to eliminate the dead spaces.

Furthermore, additional disadvantages of the prior art is that discharges occurring in the low current region reveals that ordinary ballast circuits using resistors become unstable when the discharges operate in such low current regions.

Insofar as the electron gun application of this invention, the prior art harbors the same disadvantages as stated above. In addition, such prior art cannot utilize unshielded support metallic members, since such support members in discharge path will result in intercepting naturally orbiting electrons resulting in a marked decrease in efficiency.

A specific example of prior art electron gun is shown in French Pat. No. 2,204,882 not embodying sources and sinks, having magnetic means of ionization of gas as well as employing both an electron emission filament and cathode with similar obvious disadvantages hereinabove stated.

SUMMARY OF THE INVENTION

A laser amplifier discharge power supply or supplies is disclosed which requires a degree of sophistication beyond the capabilities of any commercially available high voltage supply. As with a waveguide oscillator, a high degree of gas discharge stability is necessary for the proper operation of amplifier portions which are integral with the power supply portions. Requirements for increased gain, elimination of parasitic oscillations, flexibility in parameter selection, and operator safety define the baselines for design of the invention power source. Accordingly, the following objectives were considered in providing the requisite power supply.

One objective is elimination of dead spaces in a waveguide amplifier application in which the glow discharge power source is an integral part, to prevent gas discontinuity that would otherwise cause lensing effects (refractive index changes) and parasitic oscillations.

Another objective is to obtain a higher gain at low discharge currents, for example, currents of less than one milliampere, particularly at the higher gas pressures utilized. Consequently current regulated power supplies would be needed to maintain a discharge at these current levels and gas pressures.

Still another objective is to increase operator and operational safety by providing high voltage protection techniques. These require a design having floating outputs with respect to ground.

Though there is no empirical data concerning the correlation of discharge instability or noise and waveguide amplifier amplitude or noise, it has been demonstrated by actual testing that discharge current fluctuations cause frequency fluctuations in waveguide oscillators. Similar effects could be expected in a long waveguide amplifier where micro or nano-ampere current fluctuations may modulate the output over a very wide and intolerable range.

As a result of the achieved objectives, reduction of amplifier injected noise will decrease the closed loop error correction requirements for the supply and for the system operated by it.

The power supply design permits a large range of discharge currents to be selected. The ability to vary the discharge current in different segments of the amplifier therefore allows optimization of overall amplifier performance.

One power supply powering a waveguide amplifier includes single element anode configuration to eliminate dead zones in the amplifier. It also includes anode current limiters to insure that all segments turn on at all times. Cathode current regulators are also used to permit low current operation, and optional provisions for the use of plasma cathodes to minimize discharge current noise is possible.

A major requirement for a satisfactory glow discharge tube which avoids disadvantages of the prior art, is that current sources and current sink circuits be provided to electrodes connected in alternation through which currents associated with glow discharges are conducted. This is accomplished by the instant invention.

For the electron gun application, unlike the prior art, support members used may be metallic without effecting intercepting orbiting electrons and thereby effecting increase in efficiency of performance.

BRIEF DESCRIPTION OF THE DRAWINGS

FIG. 4 is a cross-section view similar to that of FIG. 3 showing the use of a plurality of glow discharge tubes to comprise the glow discharge power supply.

FIG. 5 is a schematic of either the current sources or current sinks as used in this invention.

FIG. 9 is a perspective view of the ion plasma gun configuration showing an upper and lower chamber according to the invention, and a gas containing chamber attached to the lower chamber which is used in laser system applications.

FIG. 10 is a cross-section of the chambers of FIG. 9 to show the basic members therein.

FIG. 11 is a cross-section of only the lower chamber of FIG. 9 showing the inside of such chamber along its length and showing electronic components connected thereto.

DETAILED DESCRIPTION

Figure 1:
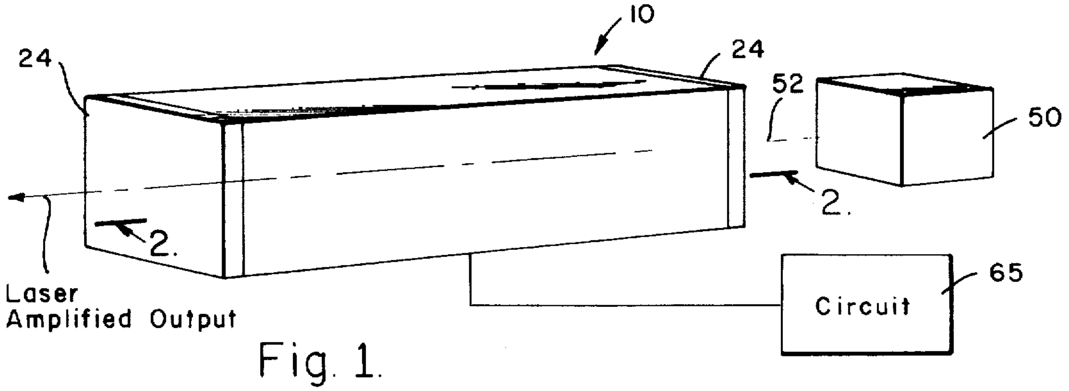
FIG. 1 is a perspective view of the inventive glow discharge power supply herein shown as used in conjunction with a laser generator source to amplify the power output from the laser generator.
Figure 2:
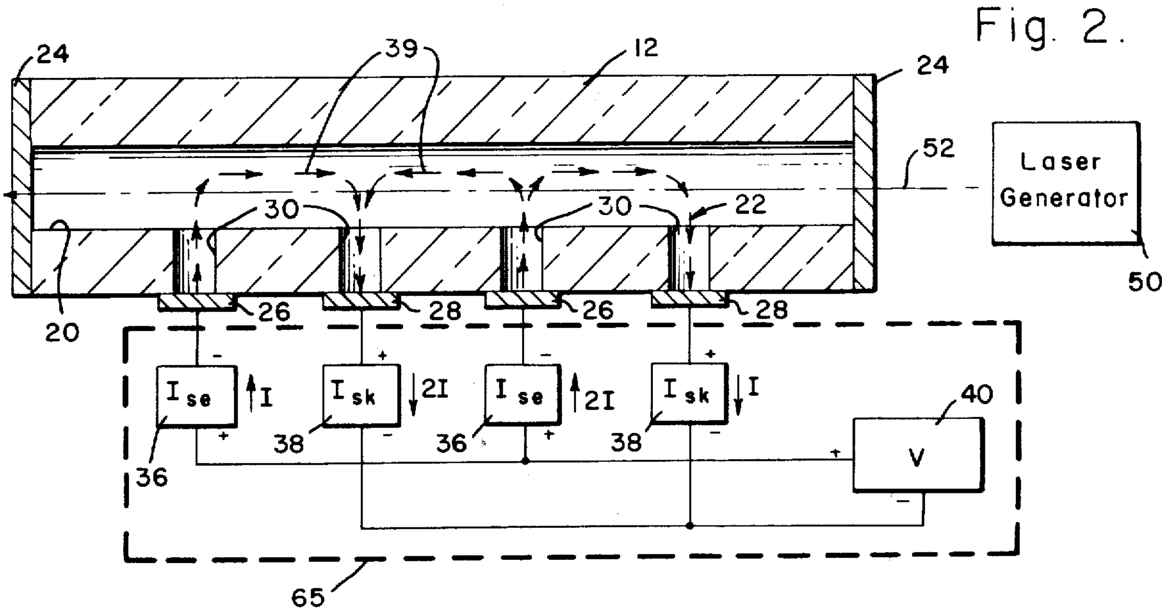
FIG. 2 is a view taken at plane 2—2 of FIG. 1 to show the cross-section view of the glow discharge tube.

Referring first to FIGS. 1 and 2, a glow discharge tube 10 is shown which as an illustrative example may be about 1 meter long and made of ceramic high electrical insulating material, such as a berylium oxide which has a 1600° C melting point.

The tube 10 has walls 12 and a capillary 20 extending through a central axis along the length of the tube. End plates are provided at 24 for blocking capillary 20 so as to enable sealing in of gas in capillary, but also acting as windows for laser wavelengths in any desired range such as a range of 0.3–14 microns. These end plates may be made of zinc selenide since this type of material acts as window for such laser frequencies. Electrodes 26 are provided alternating with electrodes 28 and spaced along the outer surface of tube 10, so that current sources as at 36 may be connected to electrodes 26 and current sinks 38 may be connected to electrodes 28.

The current sources 36 have their negative terminals connected to anodes or electrodes at 26, and their positive terminals connected to positive potential output terminal of a high voltage DC power supply 40. Current sinks 38 have their positive terminals connected to cathodes or electrodes 28, and their negative terminals connected to the negative potential output terminal of the high voltage DC power supply 40.

High voltage DC power supply 40 is adjustable in the illustrated system over a range of 0 to 70 kv and has a current capacity range from 0 currents to 225 milliampers under full load operation. A power supply having these characteristics is made by Universal Voltronics of Mount Kisco, New York, details of which are shown in their instruction manual for Model BAL-70-225-H. Supply 40, current sources 36 and current sinks 38 are shown as circuit at 65.

Referring only to FIG. 2, the cross-section view of the glow discharge tube enables us to see the structure of a plurality of apertures extending from the capillary radially outward to the surface of the capillary tube at its wall 12 so that electrodes consisting of anodes 26 and cathodes 28 block such apertures 30 which may be round, or any other shape. Glow discharges may generally be seen at 22 comprising a plurality of glow discharge paths. Each path identified at 39 is approximately 10 centimeters long. As can be seen, such glow discharge paths in capillary 20 will be created due to action of current sources and current sinks 36 and 38 respectively, which sources and sinks are powdered by DC power supply 40. It is to be noted that glow discharge current paths (+ to −) between adjacent inter-electrode spaces are in opposite directions.

The current flow through the current source will be as shown by arrows at I and 2I for the two current sources shown in this figure and the current through the current sinks 38 will be shown at arrows 2I and I for each of the two current sinks in question. The reason for twice the current in one of the current sources and twice the current in one of the current sinks is that the particular glow discharge paths being fed by these sources and sinks respectively are twice the paths compared with one having half the level of current indicated.

Consequently viewing FIG. 2 from left to right it can be seen that current flow through the first current source upward through electrode 26 through aperture 30 and the first glow discharge path will be created by virtue of the next adjacent aperture 30 and its electrode 28, with current flowing downward through the current sink 38 and returning to power supply 40. At the same time the next adjacent current source 36 having twice the amount of current through the source, such current will flow through electrode 26 through aperture 30 and ignite the gas in capillary 20 and create another pair of glow discharge paths, one path directed to the left and to the next adjacent aperature 30 and the other to the right to its next adjacent aperature 30, in both instances to flow into current sinks 38, and the current from both of these to be returned to a negative terminal of power supply 40. Of course power supply 40 will provide power at positive potential to both current sources.

It can therefore be seen that because of the arrangement of the current sources and sinks and their corresponding electrodes the gas will be ignited in capillary 20 to provide almost simultaneously a group of discharge paths of short length, namely about 10 centimeters, which unlike the prior art, will all provide current flowing through the various circuits, and current sources and sinks, to completely fill up the capillary tube with electrons due to ionization of the gas within capillary tube 20.

With respect to the cross-section area of the capillary, a variety of different areas may be used, but experimentally one area of 1 square millimeter was found to be satisfactory. Gases within capillary tube 20 which may be used in the amplifier are carbon dioxide 13% by volume, nitrogen 22% by volume and helium 65% by volume, but it is to be understood that other suitable gases and mixtures of gases may be utilized within the scope of the invention.

In view of the ignition of several gases within capillary 20, and in view that of the fact that the plurality of glow discharge paths instantaneously fill the entire capillary tube, it should be appreciated that if a laser generator at 50 is placed so that its light output is directed through window 24 into capillary tube 20, laser beam 52 will be propagated through capillary of tube 20 and exit at the other end of the capillary tube through a like window 24 at a very substantially increased power level. Such increased power level is a function of glow discharge tube overall length. The transfer of energy to the laser beam is caused by the electrons in the gas combining with the laser beam, as is well known in the art. For example, a glow discharge tube of effective length of about 4 meters will provide about a 100 watts laser output for 1 watt input. The example is calculated for a particular voltage supplied from the DC source and a particular current through the sources and sinks for constant gas pressure and irrespective of the laser wavelength as long as such wavelength is in the range 0.3–14 microns. The estimated performance characteristic of glow discharge tube length as a function of power output is approximated by the curve shown in FIG. 8.

Figure 3:
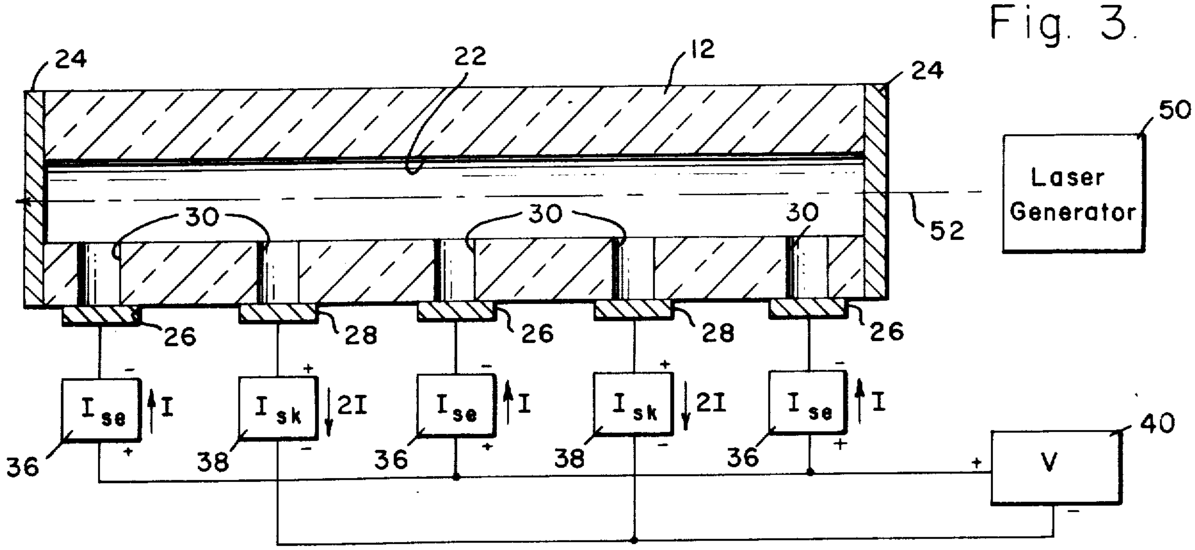
FIG. 3 is a cross-section view similar to that of FIG. 2 except that sufficient current sources and current sinks have been used to obtain a balanced current flow in the several circuits and consequently more uniform energy distribution is obtained in the various glow discharge paths.

Referring to FIG. 3 it may be seen that this figure is substantially the same as the system described in FIG. 2 except that an additional current source has been provided. This additional current source enables a more balanced distribution of currents flowing through the several current sources and current sinks.

Referring to FIG. 4 it may be seen that a system involving two glow discharge tubes side by side with circuitry the same as FIG. 3 may be utilized. Each glow discharge tube requires its own power supply 40 and its own set of current sources 36 and current sinks 38. It also requires its own electrodes or anodes 26 and cathodes 28 respectively, and each one of the discharge tubes behaves in identical manner as described in connection with FIGS. 2 and 3 insofar as generating the glow discharge within each tube. However, in this case a device to bend the output beam, provided by laser generator 50 at the input of one of these tubes and exiting from the other end thereof, can generally consist of a prism as at 60, or any suitable light turning or directing arrangement, which will direct light beam 52 so as to cause that light beam to enter through window 24 of the other glow discharge tube and exit at the other end of said other glow discharge tube as an amplified power output compared to the power output of the laser generator. As can be appreciated, many of these smaller glow discharge tubes may be stacked in like manner as just described to provide almost any length of effective glow discharge tube desired. For example, if two additional sets of tubes were stacked on top of the two illustrated in FIG. 4 and those two were coupled to the other two by means of prisms such as at 60, the effective length of the overall discharge tube previously discussed would be about 4 meters, and as such the 1 watt output of the laser generator would be amplified to provide approximately 100 watts output from the system.

Referring now to FIG. 5 a schematic of one illustrative type of circuit that may used either as a current source 36 or as a current sink 38 is shown. A 6BK4C vacuum tube is used to connect its cathode to the anode of a diode or gas diode such as type 1N5297, the cathode of such diode being the negative terminal of this circuit. Positive bias is applied to the grid of the tube generated by the use of a 50 volt source such as a battery so that the grid is positive at 50 volts with respect to the cathode of the diode. When used in any of the circuits comprising FIGS. 1–4, this current source or sink is connected in accordance with the polarity shown at the terminals of FIG. 5, so that such polarities correspond with the polarities of the current sources and current sinks in the schematics shown in FIGS. 1–4. It is to be noted that other suitable sources and sinks having similar characteristics may be utilized within the scope of the invention.

Figure 6:
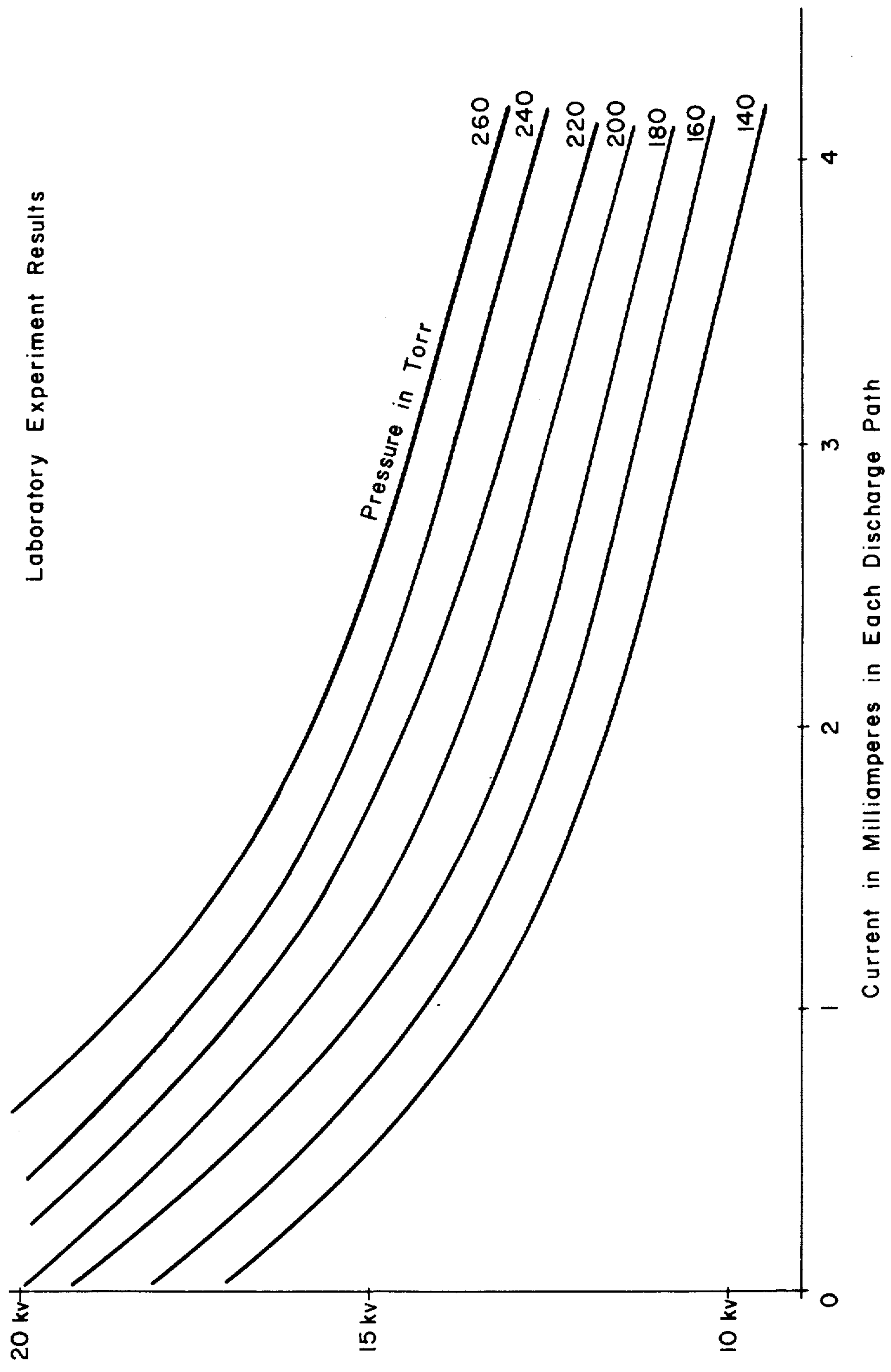
FIG. 6 comprises results from experiments conducted in order to obtain a constant pressure family of curves for various discharge voltages applied versus currents in milliamperes obtained in the discharge paths.

FIG. 6 shows laboratory results obtained under conditions where the discharge path length for each individual anode to cathode path was designed to approximately 10 centimeters, using a capillary size of 1 millimeter square diamter and having the gases within capillary 20 as indicated above. A family of constant pressure curves in Torrs are shown for discharge voltages across current anodes and cathodes 26 and 28 versus the current in milliamperes for each discharge path such as path 39 shown in FIG. 2.

Figure 7:
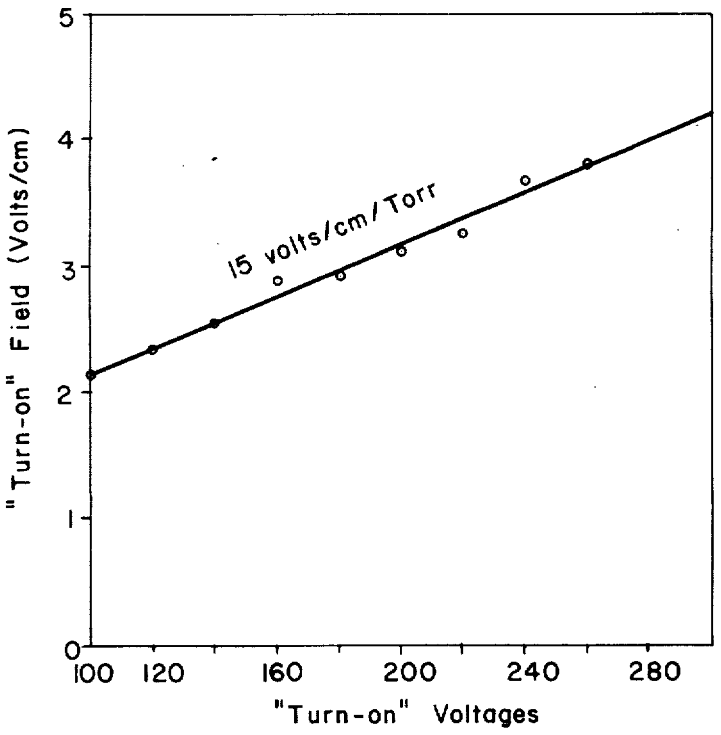
FIG. 7 shows a linear relationship for the turn on fields as supplied by an external power source to the inventive circuit versus pressure in Torr.

Referring to FIG. 7 an exemplary condition of a constant voltage of 15 volts per centrimeter per Torr is shown in a curve for the turn-on field in terms of volts per centimeter as a function of pressure in Torr. The turn-on field is that electric field produced between adjacent anodes 26 and cathodes 28.

Referring to FIGS. 1, 2, 3 and 4, it is pointed out that the inadequacy of the prior art using ballast resistors led to the consideration in this invention for the use of current sources and current sink circuits to achieve requirements for this high voltage glow discharge power source at much lower DC voltage input levels, as provided by voltage source 40. Two major requirements were met. The voltage across two adjacent electrodes was set somewhat greater than that required to initiate any discharge paths, and after initiating the discharge the dynamic impendance of the discharge and control circuits had to be positive. The dynamic impedance is the impedance looking into the current source and sinks during operative mode of the glow discharge power source. To obtain the high dynamic impedance, a constant current source and/or sink was used. A high dynamic impedance means that the change in current for a change in voltage approaches zero. The terms source and sink refer to the injection and removal of current from a current node. Ideally, such a device has an infinite impedance while being able to pass large currents at essentially zero voltage. The constant current sources 36 or sinks 38 are devices that sense the current flowing through series path elements whether these elements be semiconductors, gaseous masses which are ignited, plasma or vacuum devices, and serve to maintain constant current independent of the voltage applied across any of these sources or sinks. Such sources or sinks can be constructed with dynamic impedances of 100 megohms at say 1 KHz. These sources and sinks utilized in the several views of the invention are active circuits that can meet dynamic impedance requirement as above stated with voltage drops much smaller than with a conventional ballast resistor.

Sources 36, as well as sinks 38, are constant current regulators. As current regulators they maintain constant current through them during the time they are operative (conducting). Consequently, the voltage across these sources and sinks will vary between non-conducting and conducting periods thereof, and such variation in voltages will be seen as voltage variations across the DC power supply that supplies power to the system. Such sources are in general series path type circuits and have some minimum operating or compliance voltage, below which the current decreases with decreasing voltage as a current through a non-linear resistor might. Initially, current sources 36 are nonconducting, and there is sufficient voltage to initiate a discharge. However in practice because of small pressure, temperature, or path length variations, one discharge path will start first at a slightly lower voltage than the other. If discharge in one path is the one that breaks down the gas in the capillary first, current begins to flow in that current source and continues to flow until it reaches the current limit point where the voltage across that source can continue to increase with no increase in the current. At the same time, the adjacent current source whose current limit is set at about twice the current limit level of the first current source has reduced the voltage drop between adjacent electrodes to which the current sources are connected, further inhibiting the start of discharge of the second discharge path, by occurring half way out on its voltagecurrent characteristic curve. However, increasing the supply voltage 40 will not further change the voltage level at the electrode of the second current source. By increasing the power supply voltage, the second discharge path can be initiated while the first discharge path is being maintained. When the gas in the area of the second discharge path ignites, the current in the second current source increases and it too reaches a limit level where the excess potential required for ignition now appears at the positive terminal of power supply 40. This in brief is the basic theory behind the starting capability for almost equal and instantaneous discharge paths created by this invention through utilization of constant current sources and sinks.

Figure 8:
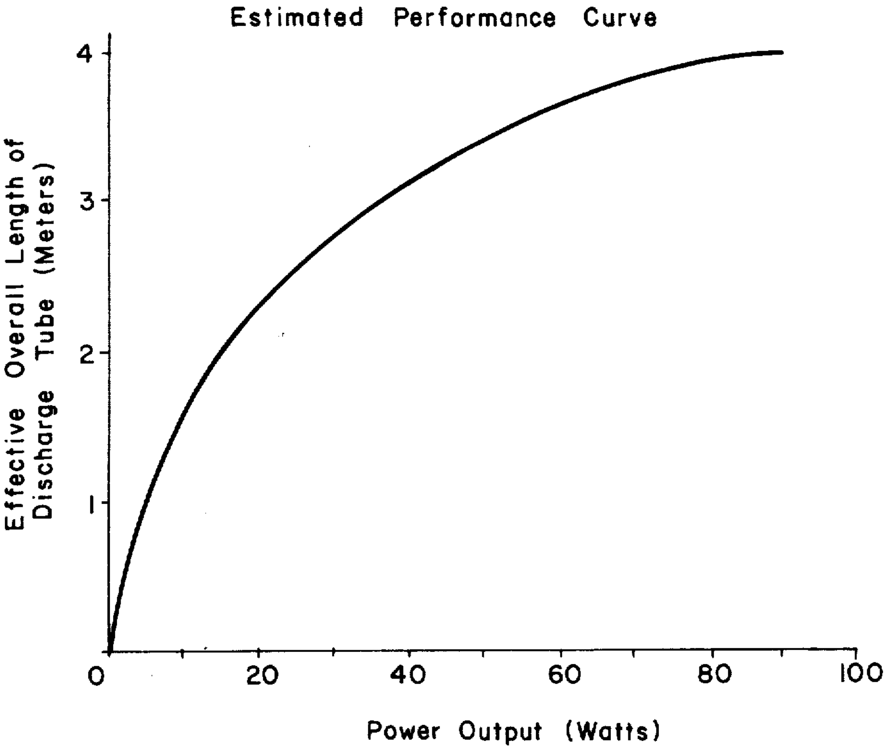
FIG. 8 is an estimated performance curve for amplification obtained by the use of the glow discharge power source in conjunction with a laser generator showing the relationship between the overall length of the glow discharge tube or tubes versus the power output in watts.

Referring to FIG. 8, it may be seen that the estimated performance curve for creating an increased power output, or amplification of laser power may be accomplished by the use of the inventive glow discharge power system. As such a power system as illustrated in FIG. 4 will probably yield about a 20 watt output for a 1 watt input from laser generator 50. However, FIG. 8 also shows that when this system is doubled in the number of elements mainly by having four capillary tubes optically coupled to each other by means of beam splitters (or mirrors) such as shown in FIG. 4, that for the same power input into the first glow discharge tube of 1 watt, a power output from the fourth glow discharge tube of about 100 watts may be expected.

It is again pointed out that in this instance the glow discharge power supply is acting very much similar to that of a vacuum tube amplifier. The analogy being that the glow discharge paths fill the entire capillary volume with electrons in motion and the laser beam accumulates such electrons when passing through the capillary, so that a larger mass of electrons exit the glow discharge tube or tubes thereby amplifying the initial power provided by the laser generator.

It may also be stated that current sources and sinks are required to obtain stable discharge paths within capillary glow discharge tubes. This is so because a high positive dynamic impedance when looking into the sink circuit at its positive terminal and at the output of the source at its negative terminal is provided by the sources and sinks, which is not practical of accomplishment using ballast resistors as in conventional art. The reason is that when using ballast resistors the current would decrease so that a tremendous increase in voltage would be required by supply voltage 40, where an increase in DC applied voltage would be substantially greater than used in the inventive system.

Again, referring to FIG. 2, the multiple discharge paths in capillary tube 10 provide the electrical pumping of the laser gas in the capillary tube. Plates at 24 at either side of the tube such as those made of zinc selenide, prevent the gas within the capillary from escaping, but act as windows for permitting wavelengths in the range of 0.3 to 14 microns pass therethrough as from a laser generator at 50. The current sources 36 connected to their respective anodes 26, and the current sinks 38 connected to their respective cathodes 28, wherein the anodes and cathodes alternate, serve to provide discharge paths within capillary 20 through aperture 30, and cumulatively provide the means for filling up capillary 20 and ionizing the gas therein with discharges as at 22 or 39 in a uniform manner and devoid of dead spaces in vicinity of apertures 30 inside the capillary internal surface.

One of the highlights of this invention therefore is utilizing in alternate connection of current sources to anodes with current sinks to cathodes.

Referring to FIGS. 9, 10 and 11, another use of the principles of the invention makes the invention usable as an ion surface for an ion plasma gun. The basic theory of operation with multiple discharges is as discussed, above in connection with FIGS. 1–8, but with a different structure.

High voltage cathode 105 is the high energy electron source within chamber 90. Cathode 105 may be made of metal. Cathode 105 produces electrons as a result of positive ion impact upon it resulting from multiple discharges, initiated in the lower hollow chamber 100, circumjacent wire 170 by virtue of the ionization of the gas therein (there is a soft vacuum in chambers 90 and 100). These electrons are accelerated to an energy level of 150 Kev at grid 110, which is a common boundary or interface between chambers 90 and 100 having perforations 111 therein. Power supply $V_3$ provides the 50–250 kilovolts; a nominal value of 150 kilovolts DC was found satisfactory.

The geometry of cathode 105 and grid 110 is tailored to maximize the electron transmission through grid 110 with a beam profile suitable for penetration through thin aluminum foil 180, which aluminum foil is a common wall interface between chamber 100 and chamber 200.

Upper housing 90 also serves as a shell around cathode 105 and together with lower housing 100 serves as a soft vacuum envelope for the cathode. The ion source is provided by means of current supplied by power supplies $V_2$ and $V_3$. The negative terminal of $V_2$ and the positive terminal of $V_3$ are at a ground potential. High voltage feedthrough insulators 140 provide means for connecting the high voltage negative terminal of power supply $V_3$ which is connected to cathode 105 by means of wires 141 feeding through insulators 140 while maintaining the soft vacuum integrity of chambers 90 and 100. The combination of wires 141 and insulators 140 provide the support for cathode 105 in chamber 90.

Common wall interface 180 serves as an electron transmission window. This window is as thin as possible, generally in the order of 0.0005 to 0.001 inches thick, in order to maximize electron transmission to chamber 200 for ionizing the laser-type gas in chamber 200, which chamber 200 is sealed. Such window is generally an aluminum foil sheet at 180, although other materials may be used.

Chamber 200 may have one end 201 and 201' thereof comprising sealing plates 240 and 240', similar to plates 24 of FIGS. 1–4, of zinc selenide so as to seal the gas in chamber 200 but provide transparency to an optical laser beam.

In addition, the foil window creates pressure differentials between chambers 100 and 200. A suitable internal pressure in chambers 90 and 100 is maintained by means of a vacuum pump and/or gas supply (not shown but connected to chamber 200). The pressure in chambers 90 and 100 is sufficient to obtain a plasma, or glow discharge therein, as described by G. W. McClure in American Physics Letters, Volume 2, No. 12, page 233, June 15, 1963. Such pressure in chambers 90 and 100 is not high enough to result in a high voltage Pachen breakdown in chamber 90. The pressure range requirements are $10^{-4}$ to $10^{-1}$mm of Hg. The thin foil window 180 is substantially in line with and faces accelerating grid 110.

Grid structure 110 may comprise one or more like grids as at 111. If one grid is used, then it serves two functions. First, as a grid to enable extraction of positive ions from lower chamber 100, and second as an anode for the accelerating electrons emitted from cathode 105. The shape and size of grid 111 will determine the final electron beam distribution and density. Any other surface or media positioned below this grid is at such a relatively low potential so as not to disturb the high energy electron beam trajectory. If one grid is used, its potential would be fixed to that of housing 90 which is at ground potential and positive potential of $V_3$. If two grids are used, the upper grid nearest cathode 105 would still be connected to chamber 90, while the lower grid nearest the foil may have a potential which is adjusted or set independent of the chamber 100 potential. This adjustable potential on grid 110 could be used to control the ion extraction rate from the discharge into the high voltage accelerating region 106 and therefore will control the total electron beam current.

Referring particulary to FIG. 11, chamber 100, which provides the ion source, includes a discharge wire with a junction at 170. This wire extends substantially axially through the center of chamber 100. Since chamber 100 is elongated, this wire extends along the length of the axis of elongation.

Power sources $V_1$ and $V_2$ are connected to provide the necessary currents for operation. Electrical connections are made to wire 170 at junctions 171 by means of conductors 161, which support wire 170. Bushings 130 are electrical insulators integral with the wall of chamber 100 and sealed to the wall of chamber 100 so as to maintain both the soft vacuum and electrical integrity. Conductors 161 are connected in alternation to positive terminals of current sinks 160 and negative terminals of current sources 150.

Electrically conductive baffles at 120 having central openings 121 therein almost surrounding wire 170 at the conductor connection junctions 171, joining wire 170 with wires 161. These baffles do not make electrical contact with either wire 170 or wire 161, the baffles being at ground potential. Wires 161 are passed through apertures 122 in baffles 120 without being in electrical contact with such baffles. Only two pairs of sources and sinks and their electrical connections to the wire 170 need be used, but actually more pairs of sources and sinks may be employed, if desired.

Constant current sources 150, as heretofore described, have their negative DC terminals of sources 150 joined together and connected to the positive terminals of supplies designated at $V_1$ and $V_2$. Nominal voltages of supplies $V_1$ would be about 100 volts and $V_2$ about 2000 volts. Constant current sinks 160 have their positive DC terminals connected in alternation by means of conductors 161 to wire 170 at junctions 171. The negative DC terminals of sinks 160 and supply $V_1$ are electrically joined.

This invention illustrates that multiple discharges can be used in an electron tube as a plasma cathode which can be elongated over an extended distance due to the contiguous nature of the discharges. By tailoring the plasma density of each discharge, spatial and temporal electron beam tailoring can be attained. By appropriate adjustments of the currents in the constant current sinks 160 it is possible to insure the required plasma density distribution for the desired electron beam profile.

This configuration results in the trapping of electrons in captive orbits about the wire 170 and leads to a gaseous discharge because these trapped electrons of relatively low energy can efficiently ionize the molecules of gas and produce additional trapped electrons which in turn, ionizes the gas. A sustaining chain reaction maintains this discharge. Conductive baffles 120 in lower chamber 100 are used to provide a partial closure of the ends of each chamber to insure that electric field components inside the chamber will deflect electrons as they approach baffles 120.

In addition to providing a tailoring of the plasma density, the source and sink current arrangement eliminates any discharge instability which has been found to exist in prior art, when the peak discharge current is increased so as to operate in the ampere range.

Once the plasma discharge has been established, the positive ions are extracted through grid 110, and are accelerated to the high voltage cathode 105. Positive ion impact at these high energies (about 150 kV) results in many secondary electrons being generated per ion impact, the number of secondary electrons depending mainly on the cathode material and ion energy. These secondary electrons are acelerated by the same high voltage to grid 110 and apertures therein 111 at positive potential, following a path 176 opposite to the positive ion path 175. Once through this grid, these high energy electrons travel undisturbed through the glow discharges within chamber 100 and pass through thin foil 180, slightly attenuated in velocity, into chamber 200 to ionize a laser-type gas utilized therein.

With respect to cathode 105, it is generally made of stainless steel, molybdenum or other metals that withstand high temperatures. Though a tungsten or like coating may be used, if desired, to provide even higher electron emission surface, such was found not to be necessary.

For each ion impact upon cathode 105 about 10 to 14 electrons are emitted by the cathode.

The cathode electron emission is caused by the ion impact thereon. Ions are created by virtue of current flowing through wire 170 supplied by current sources 150 and current sinks 160 thereto, and power being supplied by means of voltage source $V_1$ and $V_2$.

The positive terminals of $V_1$ and $V_2$ are connected to the positive terminals of current sources 150. The negative terminal of $V_1$ is connected to the negative terminals of current sinks 160. The negative terminal of $V_2$ is connected to metallic chamber 100 which is at ground potential. Thus $V_1$ floats with respect to ground but the negative side of $V_2$ is grounded. Likewise, the positive side of $V_3$ is at ground potential and the negative side of $V_3$ connects by means of wires through insulators to cathode 105. All power suppliers are DC.

The soft vacuum within chambers 90 and 100 are provided using such gases as helium, argon or possibly hydrogen at the pressures indicated of $10^{-1}$ to $10^{-4}$ mm of Hg.

When current, flows through wire 170, between the sources and sinks and junctions 171 conducted through wire 161, wire 170 is substantially at positive $V_2$ potential with respect to ground or metallic shell comprising chamber 100. With positive potential at wire 170, current therethrough, and the gas internal chambers 90–100, such gas therein will be ionized to form a plasma discharge surrounding the wire and filling cavities 190 within chamber 100.

The plasma consists of positive and negative ions. In this structure the positive ions are utilized to bombard the surface of cathode 105. Since cathode 105 is negative with respect to the positively charged ions, such positively charged ions will be accellerated through aperatures 111 in common wall 110 to impinge upon and strike the surface of cathode 105 to cause it to emit electrons in the ratio of 10 to 14 electrons per ion striking the cathode surface. Such principle is explained beginning at page 630, last paragraph, through page 334 of the textbook entitled "Collision Phenomena in Ionized Gases" by McDaniel, copyright 1964 by John Wiley and Sons, New York.

The negative ions of the plasma created in cavities 190 are caused to flow through wires 170 and 161 into sinks 160, through such sinks, to negative terminal of $V_1$, through $V_1$, into positive terminal of $V_2$, through $V_2$, and finally to ground or shell of chambers 90–100.

The emitted electrons from cathode 105 at 176 will be attracted by the postiively charged common wall 110 and accelerated through apertures 111 thereof into chamber 100. The high energy content of these electrons due to their high acceleration rates cannot be stopped in their path 176 transverse chamber 100 and cavities 190, and most of these electrons will penetrate foil interface at 180 between chambers 100 and 200 to bombard the laser type gas internal chamber 200 to ionize same.

Some of the electrons will be dispersed throughout chambers 90 and 100 hitting the walls thereof, but most (80–90%) will be accelerated through apertures 111, constituting a grid analoguous to a control grid of a vacuum tube.

Experience has shown that utilizing current sources and sinks, inapposite to a power-resistor supply, avoids high frequency oscillations (about 20 MHz) within cavities 190, when discharge currents, by virtue of gas ionization in chamber 100, are increased to the point where the current sources provided currents at one ampere or greater. Such oscillations are undesirable in that they cause the electrons accelerated through window or foil 180 to be bunched together and penetrate foil 180 in the oscillation mode, thereby creating a modulation of the discharges of the laser gas at the oscillation frequency within chamber 200. Such oscillations may be shown to be disadvantageous when in actual use of this electron gun as part of a laser system.

In FIG. 9 an electron gun is optically coupled to a laser generating source 300 creating a generated laser beam 305 output. In such application chamber 200 will have a pair of oppositely disposed surfaces at 201 and 201' which are respectively zinc selenide plates 240 and 240' to seal in the laser gas in chamber 200 but to provide optical transparency at laser or optical frequencies, thereby permitting a laser beam to be amplified so as to exit 240' at surfaces 201' as beam output at 310.

When used as an amplifier, surfaces 201 and 201' do not have to be mirrored.

When used as an oscillator, laser source 300 may be eliminated, but end plates 240 and 240' will have inner surfaces thereof 202 and 202' mirrored so as to cause the laser gas internal chamber 200 to sustain oscillations between surfaces 202 and 202' at the resonant frequency of the laser gas internal thereto.

The configuration comprising FIGS. 9–11 can be used as a high voltage electron beam tube with only the modification of substitution a thick metal plate at 180 whose thickness is in the order of 0.25 to 0.5 inches to prevent electrons from penetrating the lower wall of chamber 100. In such application chamber 200 is not used and may be removed. Also an intelligence signal input being amplified would be provided to this system by making connection between the grid and cathode of sources 150.

Figure 12:
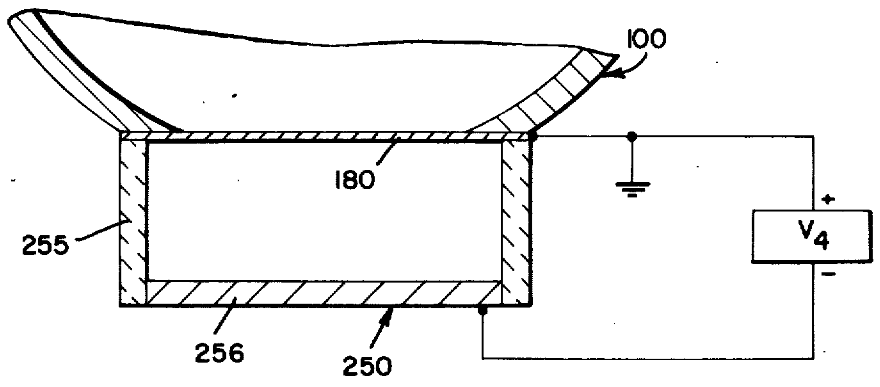
FIG. 12 is a cross-section view of a laser gas chamber as used in this invention having its own separate power source connected thereto.

Referring to FIG. 12, a variation of the laser amplifier or oscillator applications is to utilize a chamber as at 250 joining chamber 100. Chamber 250 has the same foil 180 as used in chamber 100, however walls 255 thereof are made of high temperature ceramic to withstand temperatures in the order of 1700° to 1900° C. Power source $V_4$ having its positive terminal at ground potential is connected to foil 180. The bottom plate 156 of chamber 250 is heavy gauge metal in the order of 0.5 inches thick connected to the negative terminal of $V_4$ and attached to walls 255, foil 180, and is thereby an integral part of chamber 100. This additional power source provides the power needed to cause the laser gas within chamber 250 to create laser action.

Figure 13:
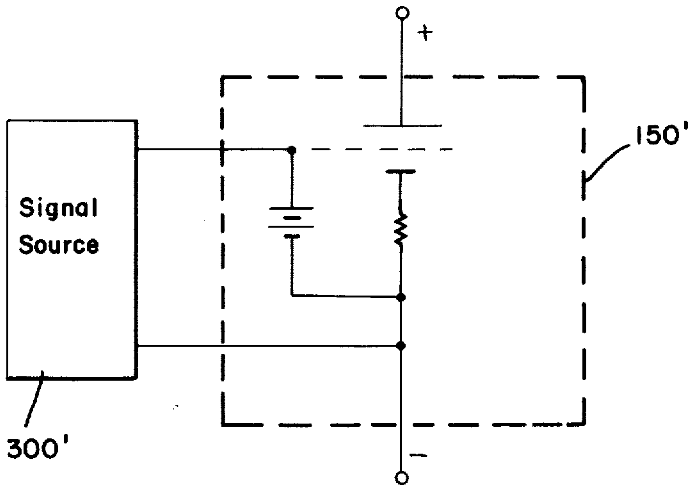
FIG. 13 is a schematic of an exemplary current source similar to the one shown in FIG. 11 but modified so as to enable the current sources to be modulated by intelligence in an electron gun use of this invention.

Referring also to FIGS. 12 and 13, for use as an amplifier modulating the laser system of FIGS. 9–11, each of the constant current sources as at 150' can be used instead of source 150, having signal source as at 300', connected between the plate and cathode of the vacuum tube used in source 150', for modulating the laser system with intelligence.

What is claimed is:

1. An electron-ion plasma source, comprising in combination:
   - a first elongated chamber having an elongated electrically conductive member extending the length of the first chamber without being in contact with the walls of said first chamber;
   - a second elongated chamber in cooperation with the first chamber and parallel thereto having a plurality of baffles within the second chamber spaced from each other, each of the baffles having a central aperture and a radial bore extending to the central aperture;
   - a wire running the length of the second chamber extending through each of the central apertures and insulated from the walls of the second chamber and the baffles; and electrical conductors joined with the wire at the central openings, one of the conductors passing respectively through a corresponding one of the bores and through the wall of the second chamber, said electrical conductors being electrically insulated from the baffles, and from the second chamber.

2. The invention as stated in claim 1, including a metallic foil as an integral part of the second chamber running the length of elongation of said second chamber.

3. The invention as stated in claim 1, including first electrical insulators spaced from each other and adapted to the first chamber, said insulators having conductive material therethrough and making electrical connection to the electrically conductive member.

4. The invention as stated in claim 1, including second electrical insulators spaced from each other and adapted to the second chamber, said second insulators having said electrical conductors extending therethrough.

5. The invention as stated in claim 1, wherein the area of cooperation between the first and second chambers comprises a common wall with perforations therein.

6. The invention as stated in claim 4, including:

current sources and sinks connected in alternation to said electrical conductors.

7. The invention as stated in claim 6, including a first DC power supply, the positive terminal of which is electrically connected to positive terminals of the current sources and the negative terminals of which is electrically connected to the negative terminals of the current sinks.

8. The invention as stated in claim 7, including a second DC power supply, the positive terminal of which is electrically connected to the positive terminal of the first supply and the positive terminals of the current sources, said second chamber being metallic and the negative terminal of the second supply being electrically connected to the second chamber.

9. The invention as stated in claim 8, including a third DC power supply, the positive terminal of which is electrically connected to the second chamber, and the negative terminal thereof being electrically connected to the electrically conductive member.

10. The invention as stated in claim 2, including a third chamber having gas therein and an opening in cooperation with the metallic foil.

11. The invention as stated in claim 10, wherein said third chamber includes end plates for sealing in said gas but which end plates are transparent to optical wavelengths.

12. The invention as stated in claim 11, including a laser generating source optically coupled to one of said end plates.

13. The invention as stated in claim 12, wherein said laser generating source has a mirrored surface for optically coupling the laser generating source to one of the end plates.

14. The invention as stated in claim 1, wherein the second elongated chamber has a plurality cavities formed by the walls thereof and the baffles.

15. The invention as stated in claim 9, including a third chamber having a gas therein and an opening in cooperation with the metallic foil, said third chamber having electrically insulating sidewalls the edges of which are in cooperation with the foil, and having a metallic base, substantially parallel to the foil, sealed to the sidewalls.

16. The invention as stated in claim 15, including a fourth DC power source with the positive terminal thereof connected to the foil and at ground potential and the negative terminal thereof connected to the base.

17. In an electron-ion plasma source, the combination comprising:

a first elongated chamber having an electronically conductive member extending substantially the length of elongation of the first chamber and electrically insulated therefrom;

a second elongated chamber, attached to the first chamber, having a common perforated wall with the first chamber and having an electrically conductive wire extending substantially the length of elongation of the second chamber; and current sources and sinks electrically connected in alternation to different points along the length of the wire.

* * * * *